US010065450B2

(12) United States Patent
Righini et al.

(10) Patent No.: US 10,065,450 B2
(45) Date of Patent: Sep. 4, 2018

(54) CYCLE WHEEL AND MANUFACTURING METHOD THEREOF

(71) Applicant: MAVIC S.A.S., Metz-Tessy (FR)

(72) Inventors: Claude Righini, Veyrier du Lac (FR); Antoine Feliciano, Doussard (FR)

(73) Assignee: MAVIC S.A.S., Metz-Tessy (FR)

( * ) Notice: Subject to any disclaimer, the term of this patent is extended or adjusted under 35 U.S.C. 154(b) by 536 days.

(21) Appl. No.: 14/200,597

(22) Filed: Mar. 7, 2014

(65) Prior Publication Data

US 2014/0252845 A1    Sep. 11, 2014

(30) Foreign Application Priority Data

Mar. 8, 2013    (FR) ..................... 13 00534

(51) Int. Cl.
| | |
|---|---|
| *B60B 21/02* | (2006.01) |
| *B60B 7/00* | (2006.01) |
| *B60B 1/00* | (2006.01) |
| *B60B 1/04* | (2006.01) |
| *B60B 5/02* | (2006.01) |
| *B60B 7/04* | (2006.01) |
| *B60B 21/06* | (2006.01) |
| *B60B 7/06* | (2006.01) |

(52) U.S. Cl.
CPC ............ *B60B 7/0006* (2013.01); *B60B 1/003* (2013.01); *B60B 1/041* (2013.01); *B60B 5/02* (2013.01); *B60B 7/00* (2013.01); *B60B 7/04* (2013.01); *B60B 21/02* (2013.01); *B60B 21/062* (2013.01); *B60B 7/06* (2013.01); *B60B 7/061* (2013.01); *B60Y 2200/13* (2013.01); *Y10T 156/10* (2015.01)

(58) Field of Classification Search
CPC ...................... B60B 21/025; B60B 21/062
USPC ............ 301/95.101, 95.104, 95.106, 95.107
See application file for complete search history.

(56) References Cited

U.S. PATENT DOCUMENTS

| | | | | | |
|---|---|---|---|---|---|
| 4,919,490 | A | * | 4/1990 | Hopkins ................... | B60B 5/02 301/104 |
| 5,073,444 | A | * | 12/1991 | Shanelec ............... | B29C 67/222 152/310 |
| 5,080,444 | A | * | 1/1992 | Hopkins ................... | B60B 5/02 301/95.102 |
| 5,249,846 | A | * | 10/1993 | Martin ..................... | B60B 5/02 301/64.705 |
| 5,490,719 | A | * | 2/1996 | Lew ....................... | B60B 3/048 301/5.1 |
| 5,653,510 | A | * | 8/1997 | Osborne ............... | B60B 21/025 301/30 |

(Continued)

FOREIGN PATENT DOCUMENTS

| | | |
|---|---|---|
| EP | 2 774 777 A1 | 9/2014 |
| FR | 2 344 411 A1 | 3/1976 |

(Continued)

*Primary Examiner* — Jeffrey J Restifo
(74) *Attorney, Agent, or Firm* — Greenblum & Bernstein, P.L.C.

(57) ABSTRACT

A cycle wheel having a rim adapted to receive a tire. The wheel is equipped with a fairing attached on the rim. The fairing is at least partially made from a material having a density less than 120 kg/m³ and a compression set at 25% compression of less than 14%. The material can be an expanded polypropylene foam, for example.

22 Claims, 6 Drawing Sheets

(56) References Cited

U.S. PATENT DOCUMENTS

| | | | | |
|---|---|---|---|---|
| 5,975,645 A * | 11/1999 | Sargent | ............... | B60B 5/02 301/55 |
| 6,398,313 B1 * | 6/2002 | Lew | ............... | B60B 1/003 301/100 |
| 6,991,298 B2 * | 1/2006 | Ording | ............... | B60B 5/02 29/894.35 |
| 6,991,300 B2 * | 1/2006 | Colegrove | ............... | B60B 5/02 188/24.13 |
| 7,258,402 B2 * | 8/2007 | Meggiolan | ............... | B29C 70/446 301/95.103 |
| 7,603,776 B2 * | 10/2009 | Jager | ............... | B60B 5/02 264/257 |
| 7,858,011 B2 * | 12/2010 | Reuteler | ............... | B29C 70/345 264/258 |
| 7,883,157 B2 * | 2/2011 | Theilig | ............... | B29C 70/84 301/64.704 |
| 8,002,362 B2 * | 8/2011 | Colegrove | ............... | B60B 5/02 301/95.103 |
| 8,162,408 B2 * | 4/2012 | Yang | ............... | B60B 1/003 301/95.102 |
| 8,528,991 B2 * | 9/2013 | Schlanger | ............... | B60B 1/003 301/55 |
| 8,757,733 B2 * | 6/2014 | Smart | ............... | B60B 21/025 301/95.102 |
| 8,882,207 B2 * | 11/2014 | Matsui | ............... | B60B 5/02 301/95.103 |
| 8,888,195 B1 * | 11/2014 | Hed | ............... | B60B 21/02 301/95.101 |
| 8,905,491 B2 * | 12/2014 | Koshiyama | ............... | B60B 1/003 301/95.102 |
| 2006/0267397 A1 * | 11/2006 | Possarnig | ............... | B60B 1/003 301/95.102 |
| 2007/0029869 A1 * | 2/2007 | Senoo | ............... | B60B 1/041 301/95.104 |
| 2007/0200422 A1 * | 8/2007 | Davis | ............... | B60B 1/003 301/95.106 |
| 2007/0205654 A1 * | 9/2007 | Denk | ............... | B60B 5/02 301/95.102 |
| 2008/0265657 A1 * | 10/2008 | Reuteler | ............... | B29C 70/345 301/95.101 |
| 2008/0265658 A1 * | 10/2008 | Reuteler | ............... | B29C 70/345 301/95.102 |
| 2009/0079257 A1 * | 3/2009 | Theilig | ............... | B29C 70/84 301/56 |
| 2009/0134695 A1 * | 5/2009 | Meggiolan | ............... | B60B 21/025 301/95.106 |
| 2010/0253132 A1 * | 10/2010 | Schlanger | ............... | B60B 1/003 301/37.24 |
| 2011/0018336 A1 * | 1/2011 | Mercat | ............... | B60B 7/01 301/95.106 |
| 2011/0089751 A1 * | 4/2011 | Saillet | ............... | B60B 5/02 301/95.103 |
| 2011/0115280 A1 | 5/2011 | Mercat et al. | | |
| 2013/0049441 A1 * | 2/2013 | Smart | ............... | B60B 21/00 301/55 |
| 2013/0169031 A1 * | 7/2013 | Alexandre | ............... | B21D 53/30 301/95.104 |
| 2014/0252845 A1 * | 9/2014 | Righini | ............... | B60B 1/003 301/37.24 |

FOREIGN PATENT DOCUMENTS

| | | |
|---|---|---|
| FR | 2 672 251 A1 | 8/1992 |
| FR | 2 701 899 A1 | 9/1994 |
| FR | 2 702 707 A1 | 9/1994 |
| FR | 2 952 587 A1 | 5/2011 |
| FR | 2 952 588 A1 | 5/2011 |

\* cited by examiner

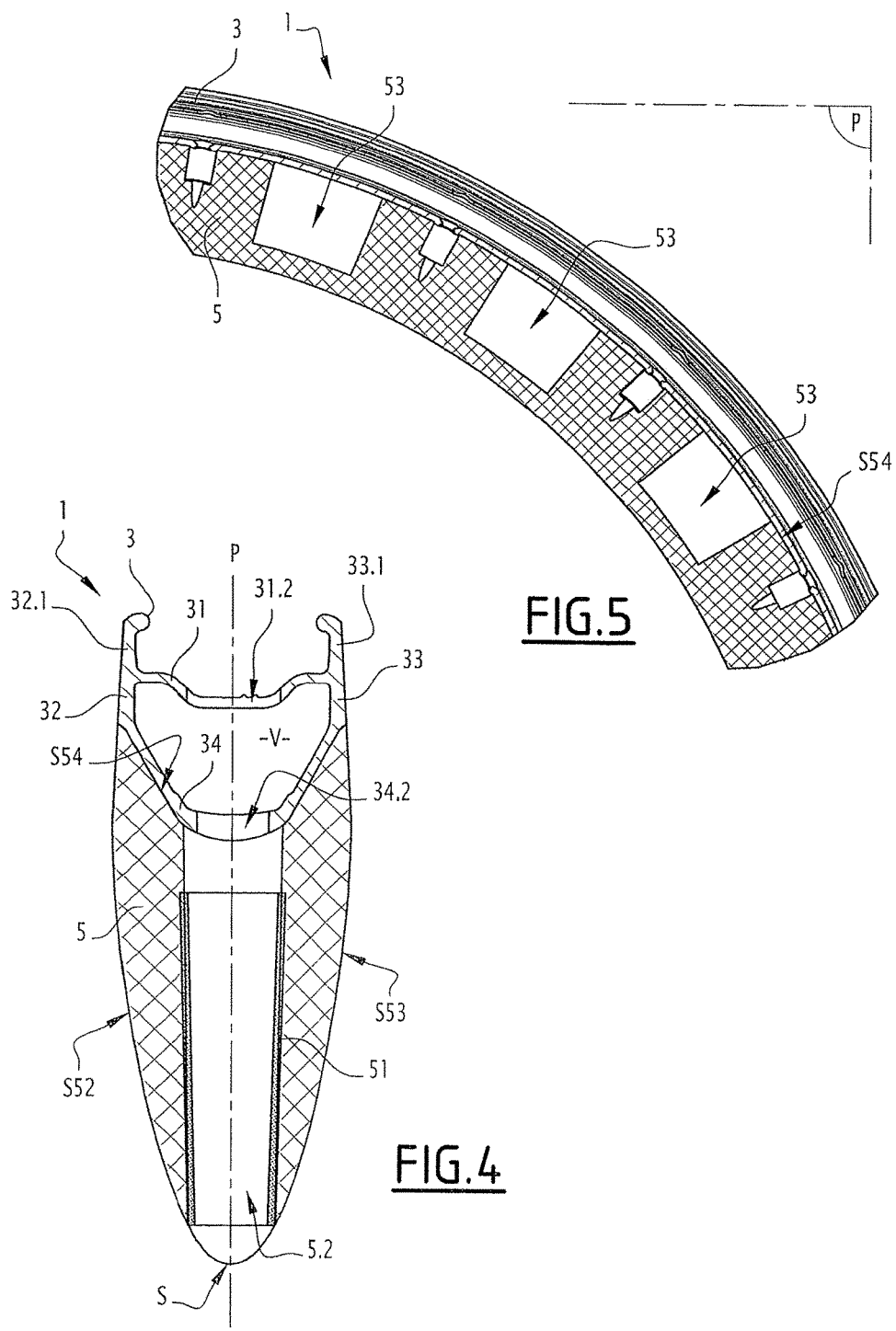

| A | P (Kg/m³) | E (MPa) | A% | ISO 1798 (kPa) | ISO 844 (25%) (kPa) | B (25%) |
|---|---|---|---|---|---|---|
| Invention | <120 | >5 | >10% | >500 | >150 | <14% |
| ARPRO 60 | 60 | 7,55 | 17% | 760 | 340 | 11,5% |
| ARPRO 80 | 80 | 13,7 | 15% | 960 | 500 | 11,5% |
| ARPRO 100 | 100 | 18,5 | 13% | 1150 | 700 | 11,5% |

CYCLE WHEEL AND MANUFACTURING METHOD THEREOF

CROSS-REFERENCE TO RELATED APPLICATION

This application is based upon French Patent Application No. 13/00534, filed Mar. 8, 2013, the disclosure of which is hereby incorporated by reference thereto in its entirety, and the priority of which is claimed under 35 U.S.C. § 119.

BACKGROUND

1. Field of the Invention

The present invention relates to a cycle wheel, and to a method for manufacturing such a wheel.

2. Background Information

In the field of cycles, in particular competition bicycles, tension spoke wheels equipped with so-called "aerodynamic" rims for reducing drag and improving the performance of cyclists are known. The rims of these wheels currently are mainly made of a carbon-based composite, which makes them expensive to produce and limits their use to high-end or competition cycles. Composite materials are not recyclable and are thus harmful to the environment. Their density is relatively high, which increases the mass of the wheels and penalizes the performance of the cyclist.

The patent document FR-A-2 344 411 discloses a bicycle wheel including a rim on which a semi-elliptical-shaped fairing made of PVC is attached and provided with slots allowing the spokes of the wheel to pass therethrough. The fairing is fixed to the rim using screws, which are difficult to reach and capable of becoming loose during the lifespan of the wheel. The fairing is relatively heavy, in view of the density of the PVC.

The patent document FR-A-2 702 707 discloses a carbon fiber and organic resin-based composite rim, which demarcates an inner volume filled with a structural foam made of synthetic resin, such as polyurethane, for example. This rim is not recyclable due to the presence of the composite material. Additionally, the structural foam is confined in the composite shell, which prevents recovery thereof for recycling. Furthermore, its manufacture is relatively complex.

SUMMARY

The invention remedies the aforementioned drawbacks by providing an aerodynamic rim that is lightweight, recyclable, easy to manufacture, inexpensive, and shock resistant.

To this end, the invention provides a cycle wheel, provided with a structure designed to receive a tire, such wheel being equipped with a fairing attached to the rim. According to the invention, the fairing is at least partially made from expanded polypropylene foam.

Consistent with the foregoing, the invention provides a cycle wheel rim comprising a structural ring that is capable of receiving a tire and a fairing attached within the structural ring, the fairing being at least partially made of a material having a density (Q) of less than 120 kg/m$^3$ and a compression set, or permanent deformation, after a 25% strain, of less than 14%.

The fairing may be made from a polypropylene-based foam, for example. This material is lightweight and recyclable, and facilitates the manufacture of the rim, as it is obtained simply by molding or machining a block of material, and it is easily assembled with the rim via elastic strain.

Moreover, these polypropylene foams have a very good elastic and plastic elongation while also having a very low plastic hysteresis after undergoing substantial strain under compression, such that these foams can be subject to small impacts related to manipulations of the wheel (carrying, cleaning, etc.) without requiring an additional surface protection shell, which would add significant extra weight.

According to advantageous but not essential or mandatory aspects of the invention, a wheel of the aforementioned type may incorporate one or more of the following characteristics, taken in any technically feasible combination:

the polypropylene-based material at least partially constitutes the outer surface of the fairing;
the foam modulus of elasticity is greater than 5 MPa;
the foam breaking elongation is greater than 10%;
the foam tensile strength is greater than 500 kPa;
the foam resistance to 25% compression is greater than 150 kPa.
On a sample of 10 mm thickness of the material forming the fairing, the compression set generated by a 2.5 mm penetration depth of a hemispherical punch of 10 mm in diameter is less than 1.4 mm;
the polypropylene is of the polypropylene copolymer type;
in the absence of mechanical stresses, the diameter of an outer surface of the fairing, coming into contact with a bridge of the rim in the assembled configuration, is strictly greater than the diameter of the bridge, greater by about 0.5 mm in a first embodiment, and greater than about 1.0 mm in a second embodiment;
the fairing is comprised of two portions assembled to one another, such portions being at least partially made from expanded polypropylene foam;
the two portions have a different foam density;
the fairing comprises inner recesses;
the fairing comprises holes for passage of the wheel spokes, such holes being made in particular by hot-stamping or by drilling;
the fairing is removable via elastic strain;
the fairing comprises at least one structural reinforcement.

The invention also provides a method for manufacturing a wheel of the aforementioned type, including:
a) the fairing and the rim are manufactured separately;
b) the fairing is assembled with the rim via elastic strain thereof.

BRIEF DESCRIPTION OF DRAWINGS

The invention will be better understood and other advantages thereof will appear more clearly from the following description of several embodiments of a wheel according to its principle and of a method for manufacturing such a wheel, given solely by way of example and with reference to the annexed drawings, in which:

FIGS. 2, 3 and 4 are partial radial cross sections, on a larger scale, in the planes II, III, and IV of FIG. 1;

FIG. 5 is a partial cross section, along the plane P, of the detail V of FIG. 1;

DETAILED DESCRIPTION

Figure 1:
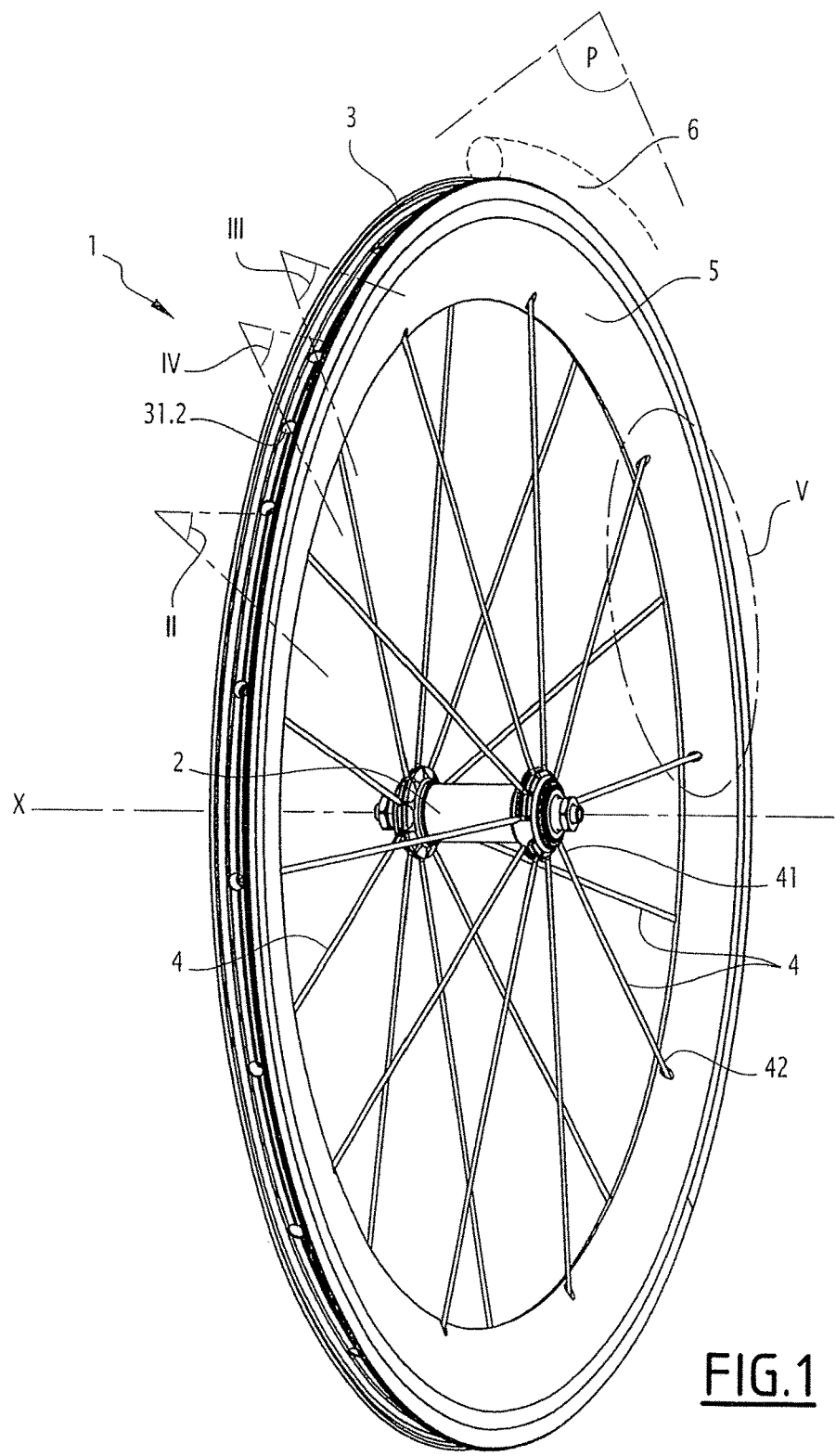
FIG. 1 is a perspective view of a wheel according to the invention.
Figures 2, 3:
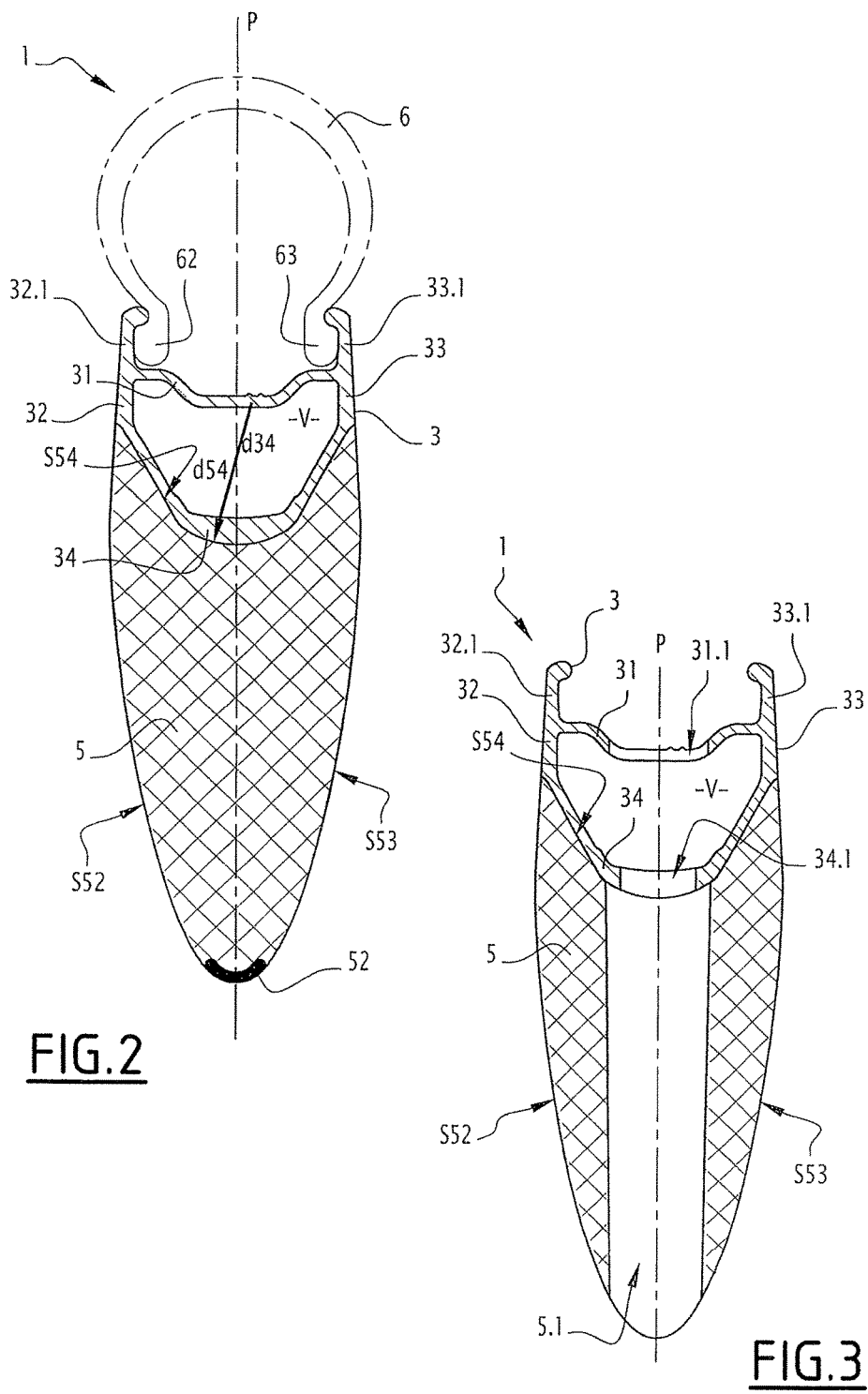

The wheel 1 shown in FIGS. 1 to 6 is designed, or structured and arranged, to be fitted with a tire 6 shown partially in broken-line outline in FIGS. 1 and 2 only.

The wheel 1 includes a rim 3 comprising aluminum, and a hub 2 adapted to be attached to a portion of a bicycle, i.e., the front fork in the illustrated example, the wheel 1 being a front bicycle wheel. The invention is also applicable to a rear bicycle wheel equipped with a cogset.

The wheel 1 is rotatable about an axis X in relation to the fork of the bicycle.

Spokes 4 are tensioned between the rim 3 and the hub 2.

A fairing 5 is also a part of the wheel 1 and is comprised of a tapered annular element made at least partially from an expanded polypropylene-based material, such as the material marketed under the trademark ARPRO® by the company JSP, and more specifically referred to as ARPRO 60, ARPRO 80, and ARPRO 100, in which 60, 80 and 100 refer to the density ρ (rho), that is to say the density expressed in $kg/m^3$. The density of the material forming the fairing 5 is less than 120 $kg/m^3$, that is, at least 7.5 times less than the base polypropylene, thereby making it possible to make the wheel 1 light in weight.

ARPRO is a polypropylene copolymer possibly containing mineral and organic elements, for example pigments for coloring the material. The polypropylene is expanded, such as with carbon dioxide or air.

Each spoke 4 is fastened via a first end 41 thereof to the hub 2, and its second threaded end 42 comprises an attachment device designed to attach the end 42 to the rim 3, such as a nut extending through a hole 34.1 made in the lower bridge 34 of the aluminum rim and taking support on the inside of the rim, the adjustment of the spoke tension and the truing of the wheel being ensured by the threaded-tightening of the latter.

As shown in FIGS. 2 to 4, the radial cross section of the rim 3 is in the form of a casing that is hollow or otherwise U-shaped. By radial cross section is meant a cross section in a plane such as any of the planes II, III, and IV in FIG. 1, that is to say, a cross section passing through the X-axis and oriented along a radial direction in relation to the X-axis.

The radial cross section of the rim 3 includes a transverse wall 31 connecting the two vertical arms of the "U", two sidewalls 32 and 33, and a bridge 34 of rounded shape.

The bridge 34 connects the sidewalls 32 and 33 to one another and forms the curved portion of the U-shaped cross section. The convex side of the bridge 34 faces the axis of rotation X.

The bridge 34 is located on the side of the axis of rotation X, and the transverse wall 31 is located on the side of the tire 6. The rim 3 thus demarcates an inner volume V.

On opposite ends of the bridge 31, the sidewalls 32 and 33 are provided with flanges 32.1, 33.1, respectively, designed to engage and fix the beads 62 and 63 of the tire 6. In the context of the this description, a tire may be a beaded tire, with the beads designed to cooperate with respective ones of the flanges of the rim, or a tubular tire, sometimes referred to as tubular tire, which is secured to the rim with adhesive. The flanges 32.1 and 33.1 constitute a structure for receiving the tire 6. Alternatively, the rim 3 may be provided with another structure for receiving a tire 6, in the case in which tires of the "tubular" type, for example, are used.

A median plane P of the wheel 1 is a plane perpendicular to the X-axis, the median plane P passing between the sidewalls 32 and 33 and between the flanges 32.1 and 33.1, equidistant therefrom. Thus, the sidewalls 32 and 33 are located on both sides of the median plane P.

The fairing 5 comprises an outer surface S54, turned away from the axis of rotation X, in contact with the bridge 34 of the rim 3. The outer surface S54 is concave and has a geometry complementary to that of the bridge 34.

The outer surface of the fairing is almost entirely comprised of the expanded polypropylene-based material, without it being necessary to cover it with an outer skin made of a more rigid material.

The outer surface S54 of the fairing 5 is extended towards the axis of rotation X by two side surfaces S52 and S53, which are joined in the area of an apex S, having a rounded shape, of the fairing 5. The side surfaces S52 and S53 of the fairing are co-extensive with the sidewalls 32 and 33 of the rim 3, as shown in FIGS. 2-4, for example, so as to define a rim/fairing assembly having a smooth and perfectly aerodynamic contour.

As can be seen in FIG. 3, the bridge 34 and the transverse wall 31 of the rim 3 comprise holes 34.1 and 31.1, respectively, for passage of the spokes 4. These holes 34.1 and 31.1 are extended through the fairing 5 by a hole 5.1. The holes 31.1, 34.1, and 5.1 make it possible to fix the second threaded ends 42 of the spokes 4 to the rim 3 using the spoke nipples.

A valve passage, comprising holes 31.2, 34.2, and 5.2, shown in FIG. 4, is made through the transverse wall 31, the bridge 34, and the fairing 5. A thermoplastic tube 51 is glued in the valve hole 5.2, within the fairing 5, and makes it possible to guide the valve of the tube while also avoiding damage to the fairing if the user were to exert excessive force on the valve during inflation. When the tire 6 is mounted on the rim 3, the tire valve is inserted into the valve hole 31.2, 34.2, and 5.2, and projects outward of the rim 3 and fairing 5.

An annular structural reinforcement 52, shown only in FIG. 2 and made, for example, from a curved or bent thermoplastic profile element, is arranged in the area of the apex S of the fairing 5 for reinforcing the fairing in this zone, in order to prevent damage to the fairing if the bike were to be parked, suspended vertically by a hook supported on the apex of the fairing, for storage.

In an alternative embodiment, the fairing 5 comprises at least one rigid structural reinforcement which replaces or complements the reinforcement 52. For example, a thermoplastic skeleton structurally reinforces the foam of the fairing; such skeleton may be overmolded in the polypropylene foam. But, in any event, in the exemplary embodiment shown in FIG. 2, the outer surface of the fairing 5 is almost entirely made from the material having a density of less than 120 $kg/m^3$.

As can be seen in FIG. 5, the material of the fairing 5 comprises inner recesses 53, such as circumferentially spaced-apart inner recesses that which open out in the area of the outer surface S54. As shown in FIG. 5, the inner recesses 53 alternate with circumferentially spaced apart regions of the material of the fairing. The recesses 53 make it possible to reduce the mass of the fairing 5.

During manufacture of the wheel 1, the rim 3 and fairing 5 are first manufactured separately.

The rim 3 is created, for example, by aluminum profiling, such as extrusion. The profiles are then bent along a helical shape. Thus, by sectioning the bent profiles on two substantially aligned portions of the helical shape, an open rim blank can be made in the form of a 360° helix section. The rim 3 is then formed from this blank, by butt joining the ends of the sectioned blank, and by connecting them, for example by welding or with attached fasteners.

The fairing 5 is made by molding, for example. The mold can be made to be porous in order to obtain a smoother surface appearance. The recesses 53 and the holes 5.1 and 5.2 can be created during molding, or subsequently, for example by drilling or by hot-stamping. Alternatively, the fairing 5 is machined from a solid mass.

Then, the fairing 5 is assembled with the rim 3 by slightly straining it elastically to enable the concave outer surface S54 of the fairing 5 to be positioned against the bridge 34 of the rim 3. It is therefore necessary for the material forming the fairing 5 to be sufficiently flexible and elastic to enable this strain, or deformation.

Alternatively, the rim can be sleeved during the final operation by inserting the fairing within the rim prior to the sleeving; the sleeving will then shrink-fit the fairing within the rim at the end, and it will not be necessary to strain the fairing for insertion into the rim.

In the absence of mechanical stresses, for example prior to assembly, the diameter d54 of the outer surface S54 is slightly greater than the diameter d34 of the bridge 34, such as greater by about 1.0 mm. More precisely, in each sectional plane perpendicular to the X-axis and between the lateral surfaces S52 and S54, the diameter d54 of the outer surface S54, measured along a radial direction, is slightly greater than the diameter d34 of the bridge 34, measured in the same sectional plane, perpendicular to the X-axis. In particular, in the median plane P, the diameter d54 of the outer surface S54 is slightly greater than the diameter d34 of the bridge 34.

Thus, the fairing 5 is forcibly assembled to the rim 3. Once the fairing 5 is positioned against the rim 3, the pressure forces exerted by the fairing 5 on the rim 3 hold the assembly in place.

During spoking of the wheel, the spoke tension and tire pressure reduce the diameter of the rim by several tenths of a millimeter due to the compressive force induced in the rim 3. This phenomenon does increase the shrink-fit, or force-fit, of the fairing 5 in the rim 3, thereby ensuring very good retention.

Figures 8, 10:
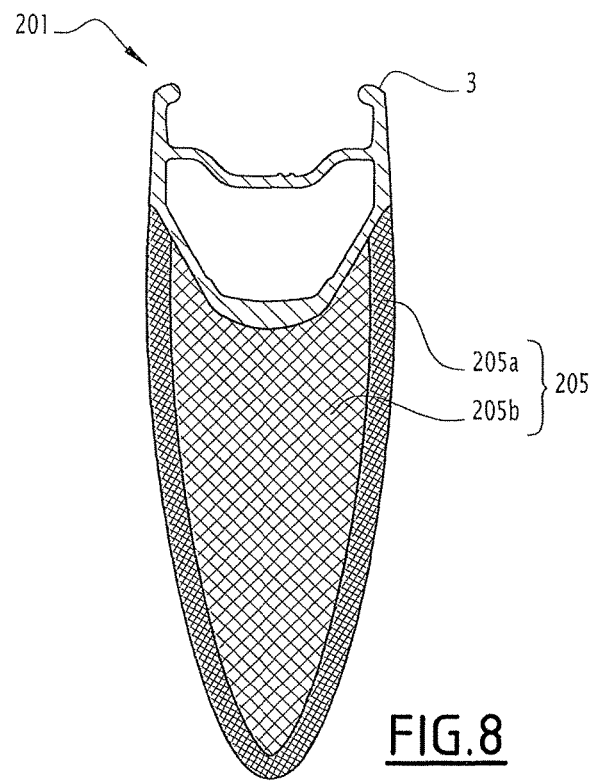
FIG. 10 is a table showing the mechanical properties for various materials which can be used to make the fairing.

The table in FIG. 10 shows characteristic parameters of ARPRO 60, ARPRO 80, and ARPRO 100.

The modulus of elasticity E of the fairing 5 is greater than 5 MPa, which provides it with good rigidity guaranteeing excellent assembly strength, while enabling disassembly of the fairing 5. For example, for ARPRO 60, ARPRO 80, and ARPRO 100, the modulus of elasticity E of the fairing 5 is equal to 7.6 MPa, 13.7 MPa, and 18.5 MPa, respectively.

For comparison, polyurethane foams are not suitable for this fairing application because, for a comparable density of 60 Kg/m$^3$, the modulus is only about 0.1 MPa, which does not impart sufficient stiffness to the fairing for the latter to be functionally acceptable.

Figures 6, 7:
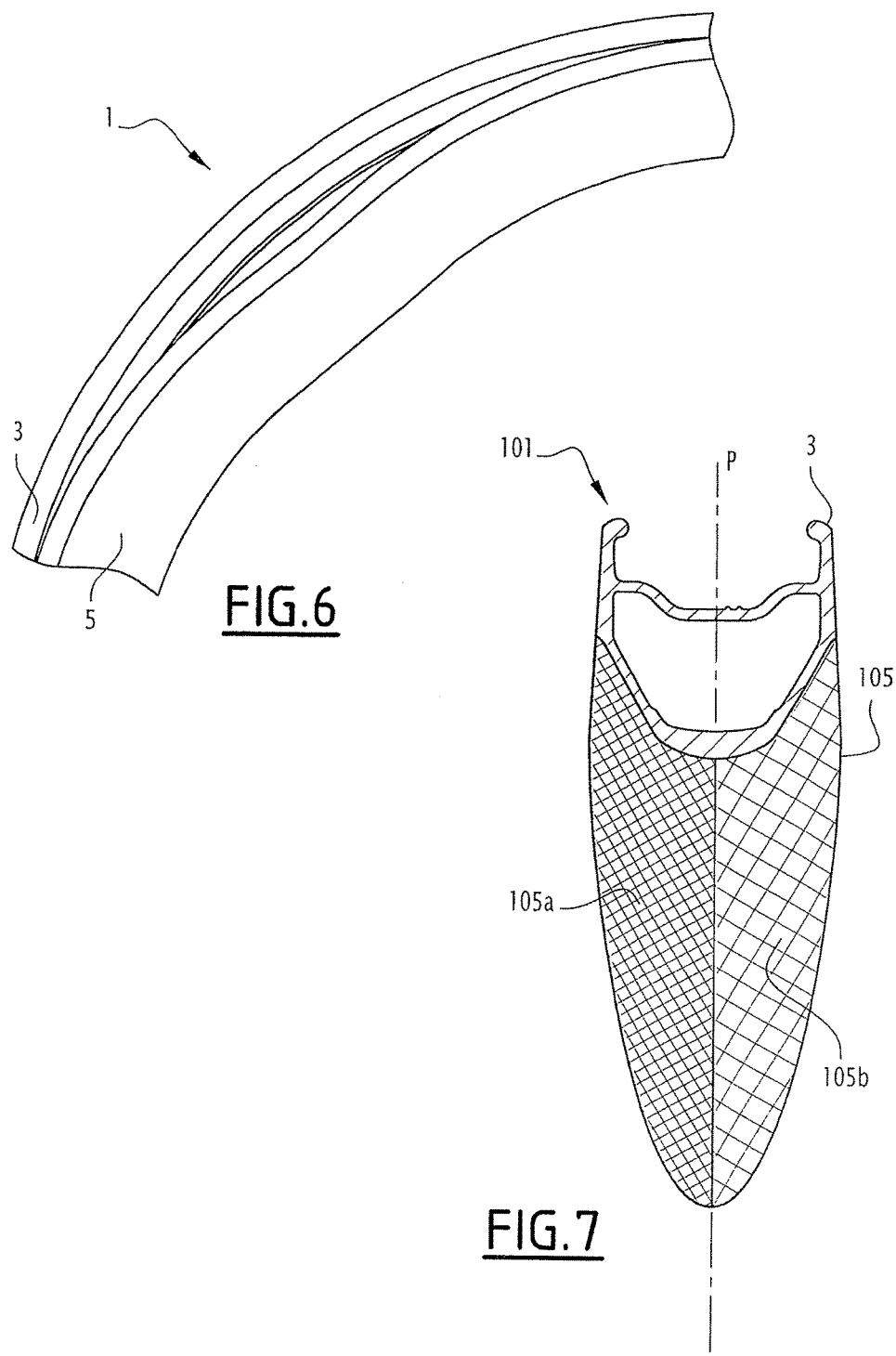
FIG. 6 is a partial lateral view of the detail V of FIG. 1, during assembly or disassembly of the wheel.
FIGS. 7 and 8 are cross sections similar to FIG. 2, for second and third embodiments of the invention.

As shown in FIG. 6, the fairing 5 is sufficiently flexible to be deformable for removal. This makes it possible to replace the fairing 5, if damaged, for example. Moreover, this enables the wheel 1 to be recycled by separating its constituent elements. In particular, the fairing 5 is made from a recyclable material, meaning that the used expanded polypropylene foam can be reinserted in the production cycle of the fairing 5, when the fairing 5 has reached the end of its lifespan.

Figure 9:
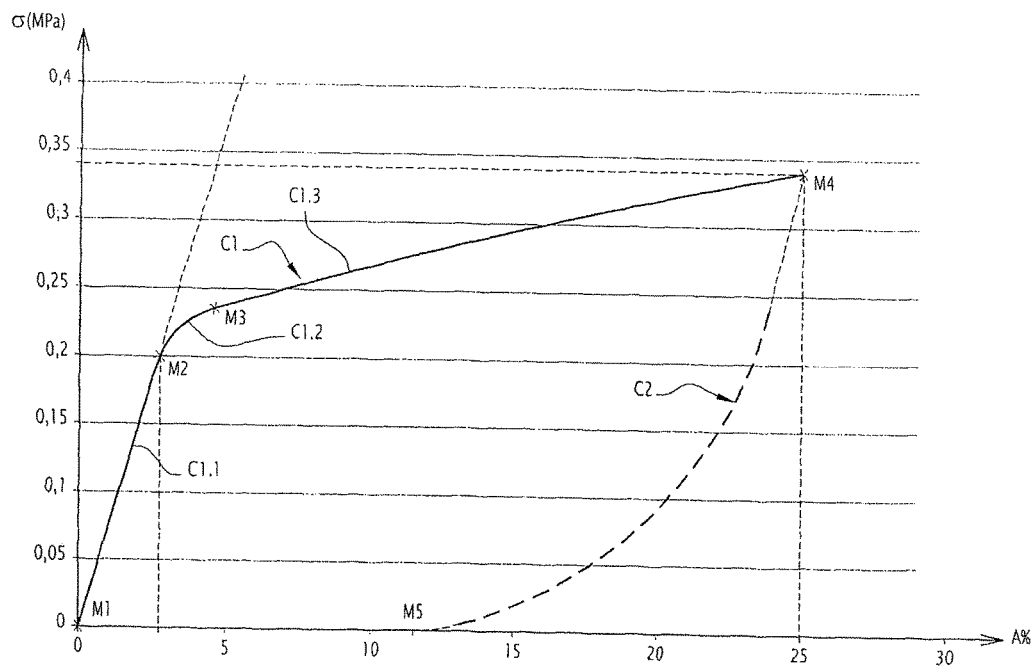
FIG. 9 is a graph showing the compressive behavior of a cubic sample of polypropylene foam like the material used in the wheel of FIG. 1.

The graph of FIG. 9 shows the compressive behavior at 25% compression of a sample of the material forming the fairing 5, namely the ARPRO 60 polypropylene foam. The abscissa axis indicates the absolute value of the elongation A, which is expressed in %, and the ordinate axis indicates the compressive stress a, expressed in MPa.

The elongation at breakage A (%) is given by the relationship $$A = 100 \cdot \frac{L - L0}{L0},$$

where:
L0 is the initial length of the sample before the start of the tensile test,
L is the length of the sample at breakage.

A first curve C1, shown in solid line, illustrates the behavior of the material under compression, and extends between a point M1 and a point M4.

A rectilinear portion C1.1 of the curve is defined between the point M1, located at the origin, and a point M2. Between the points M1 and M2, the elongation A increases proportionally as and when the compression stress a increases. Conventionally, the portion C1.1 corresponds to an elastic strain of the material, and its slope makes it possible to define the Young's modulus E of the material. At point M2, the elongation A is approximately equal to 2.6% and the compression stress a is approximately equal to 0.2 MPa.

The modulus of elasticity is defined by the Hooke's law:

$$\sigma = E \cdot \varepsilon, \text{ that is, } E = \sigma/\varepsilon$$

where σ (sigma) is the tensile or compressive stress and ε (epsilon) the strain or elongation described above. The Young's modulus of the ARPRO 60 material can thus be recalculated by dividing 0.2 MPa by 0.026, that is, about 7.6 MPa.

A transitional portion C1.2 of the curve C1 extends between the point M2 and a point M3. The slope of the curve C1 decreases along the transitional portion C1.2.

A third portion C1.3 of the curve C1 extends between the points M3 and M4. The third portion C1.3 is substantially linear, and its slope is smaller than that of the first portion C1.1. In the area of point M4, the elongation A is equal to 25%; in other words, the material has been compressed by 25% in relation to its original dimensions. The compression stress a is equal to about 0.34 MPa.

A second curve C2, shown in broken lines, extends between the point M4 and a point M5, and represents the behavior of the material when the compression stress a decreases, after being compressed along the curve C1 and kept under compression for 22 hours at a temperature of 23° C. The elongation A decreases, i.e., the dimensions of the sample increase, between the points M4 and M5.

At point M5, the compression stress a is equal to zero, and the elongation A is equal to about 11.5%. In other words, once the compression stress a is removed, the dimensions of the sample are decreased by 11.5%.

In the example shown in FIG. 10, for ARPRO 60, the compression set, or permanent deformation, at 25% compression, designated by the reference character B, after exceeding the yield point, is equal to 11.5%. This is also the case for ARPRO 80 and ARPRO 100. In the context of the invention, the compression set at 25% compression is, in a particular embodiment, less than 14%. In this way, the foam of the fairing can withstand local loads or moderate impacts generated, for example, when handling the wheels for storage in a car trunk, or during accidental falls of the cyclist, without the wheel being visually impacted.

The elongation at breakage of the fairing 5, conventionally referred to as A %, is greater than 10%, which prevents it from being marked during handling. In this way, when the wheel 1 is manipulated, or handled, for example during transport, it is not marked by bumps and minor impacts. The elongation at breakage A % is given by the relationship $$A\% = 100 \cdot \frac{Lu - L0}{L0},$$

where:

L0 is the initial length of the sample before the start of the tensile test,

Lu is the length of the sample at breakage.

The elongation at breakage A % of ARPRO 60, ARPRO 80, and ARPRO 100 is equal to 11.5%.

For comparison, polymethacrylimide foams, widely used in composite structures and known under the trademark ROHACELL®, have excellent modulus and low density, but have, at equivalent density, a tensile elongation at breakage of only 3% and a compression set at 25% compression greater than 21%, making them very sensitive to small impacts, such that the fairing would be very quickly broken or dented by any small impacts.

Similarly, expanded polystyrene foams, at comparable density, have a maximum tensile elongation at breakage on the order of 4% and a compression set of 20% at 25% compression. These foams are also chemically very sensitive to solvents.

As shown in FIG. 10, the tensile strength of ARPRO 60, ARPRO 80, and ARPRO 100, defined by the ISO 1798 standard, is equal to 760 kPa, 960 kPa, and 1150 kPa, respectively. In the context of the invention, the tensile strength of the fairing 5, defined by the ISO 1798 standard, is greater than 500 kPa.

The compressive strength of ARPRO 60, ARPRO 80, and ARPRO 100, defined by the ISO 844 standard, is equal to 340 kPa, 500 kPa, and 700 kPa, respectively, under a compressive strain equal to 25%. In the context of the invention, the compressive strength under a 25% strain of the fairing 5, defined by the ISO 844 standard, is greater than 150 kPa.

The tensile and compressive strength ensures a good mechanical strength of the fairing 5.

The material forming the fairing 5 is insensitive to solvents such as gasoline and heavy naphtha (white spirit). Thus, traces of grease that appear during use of the cycle or lubrication of the transmission chain can be cleaned up without damaging the fairing 5.

The material forming the fairing 5 is a sound-absorbing material, which reduces potential noise.

The fairing 5 can be varnished or painted in order to increase its surface hardness or for decoration.

FIGS. 7 and 8 show second and third embodiments of the invention, in which the elements similar to those of the wheel 1 of FIGS. 1 to 6 are designated by the same reference numerals.

The elements similar to those of FIGS. 1 to 6 are not further described in detail.

FIG. 7 shows a wheel 101 including a rim 3 similar to the rim 3 of FIGS. 1 to 6. The wheel 101 includes a fairing 105 comprised of two portions 105a and 105b which, once assembled to one another, have the same geometry as the fairing 5 of the wheel 1. The portions 105a and 105b are symmetrical and in contact with one another in the area of the plane P. The portions 105a and 105b are assembled to one another with adhesive. The portions 105a and 105b are made from the same material.

In an alternative embodiment, the portions 105a and 105b can be assembled via a positive connection, e.g., using a mortise and tenon arrangement.

FIG. 8 shows a wheel 201 including a rim 3 similar to the rim 3 of FIGS. 1 to 7. The wheel 201 includes a fairing 205 comprised of two portions 205a and 205b which, once assembled to one another, have the same geometry as the fairing 5 of the wheel 1. The portion 205a forms an outer shell, the radial cross section of which is U-shaped. The portion 205b forms a core arranged within the portion 205a.

The shell 205a is made from a material having a mechanical strength greater than that of the core 205b. It is thus possible to optimize the mechanical strength and mass of the fairing 205 by using a dual-density fairing.

In a particular embodiment, the outer surface S54 of the fairing 5 can be adhesively secured to the rim 3.

The polypropylene foam forming the fairing 5 can be mixed with other materials. In such a case, the fairing 5 is at least partially made from a polypropylene-based foam.

Materials other than expanded polypropylene may be used in the context of the invention, provided that they have a density of less than 120 kg/m$^3$ and a low compression set.

Figure 11:
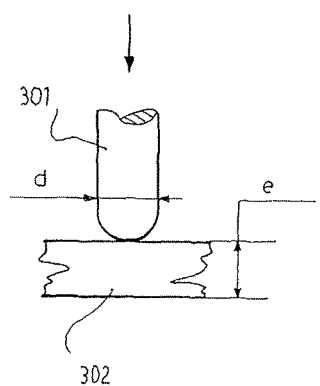
FIG. 11 is a schematic view of a marking test for evaluating the compression set of a material.

Such materials are subject to a marking test using a punch in order to evaluate their compression set. FIG. 11 schematically depicts this marking test.

A punch 301, the end of which has a hemispherical surface with a diameter d=10 mm, is mounted on a tractiometer (not shown). A sample 302 having a thickness e=10 mm is positioned under the punch. The area of the front surface of the sample is greater than 200 mm$^2$. A force is applied to the sample using the punch, such that the thickness of the sample decreases by 25%. In this case, the punch is initially lowered until it is flush with the surface of the sample. This is the reference position of the punch. In a second step, the punch is lowered by 2.5 mm. The force required for a 2.5 mm penetration of the punch into the sample is recorded. The value of this force provides an indication of the rigidity of the material. In a particular embodiment, materials for which a force of at least 20 N is required for a 2.5 mm penetration of the punch into the sample are selected.

In a third step, the force applied by the punch is released by raising the punch progressively. As the punch is being raised, the force applied to the sample is precisely monitored. When this force is zero, the position of the punch is recorded. This position corresponds to the compression set after a 25% compression.

Upon completion of this test, the materials selected to make the fairing according to the invention must have a compression set of less than 1.4 mm, i.e., 14% of the initial thickness. A fairing made from such a material is not sensitive to small impacts. Furthermore, in order not to weigh down the wheel, materials having a density greater than 120 kg/m$^3$ are not used.

In the case in which the material to be evaluated by the marking test is in the form of a sheet whose thickness is less than 10 mm, a plurality of sheets are assembled until obtaining a sample having a thickness greater than 10 mm.

In the context of the invention, the various embodiments described can be combined, at least partially.

Lastly, at least because the invention is disclosed herein in a manner that enables one to make and use it, by virtue of the disclosure of particular exemplary embodiments of the invention, the invention can be practiced in the absence of any additional element or additional structure that is not specifically disclosed herein.

The invention claimed is:

1. A cycle wheel comprising:
a rim;
the rim having a structure designed to receive a tire;
a fairing affixed to the rim opposite the structure of the rim designed to receive the tire;
the fairing being at least partially made from a material having a density less than 120 kg/m$^3$; and
the material at least partially forming a fairing outer surface.

2. A cycle wheel according to claim 1, wherein:
the material at least partially forming the fairing has a compression set, at 25% compression, of less than 14%.

3. A cycle wheel according to claim 1, wherein:
the material has a modulus of elasticity greater than 5 MPa.

4. A cycle wheel according to claim 1, wherein:
the material has an elongation at breakage greater than 10%.

5. A cycle wheel according to claim 1, wherein:
the material has a tensile strength greater than 500 kPa.

6. A cycle wheel according to claim 1, wherein:
the material has a strength, at 25% compression, greater than 150 kPa.

7. A cycle wheel according to claim 1, wherein:
the material is an expanded polypropylene foam.

8. A cycle wheel according to claim 7, wherein:
the polypropylene is of the polypropylene copolymer type.

9. A cycle wheel according to claim 1, wherein:
with no mechanical stress, an outer surface of the fairing, engaged with a bridge of the rim in an assembled configuration, has a diameter greater than a diameter of the bridge.

10. A cycle wheel according to claim 9, wherein:
the diameter of the outer surface of the fairing is about 1.0 mm greater than the diameter of the bridge.

11. A cycle wheel according to claim 1, wherein:
the fairing is comprised of two portions assembled to one another, at least partially made from a material having a density less than 120 kg/m$^3$ and a compression set, at 25% compression, of less than 14%.

12. A cycle wheel according to claim 11, wherein:
the two portions of the fairing have different densities.

13. A cycle wheel according to claim 1, wherein:
the fairing comprises internal recesses.

14. A cycle wheel according to claim 1, wherein:
the fairing comprises holes designed for passage of the spokes of the wheel, the holes having been made by hot-stamping or by drilling.

15. A cycle wheel according to claim 1, wherein:
the fairing is designed for removal via elastic strain.

16. A cycle wheel according to claim 1, wherein:
the fairing comprises at least one structural reinforcement.

17. A method for manufacturing the cycle wheel of claim 1, the method comprising:
manufacturing the rim and the fairing separately;
assembling the fairing with the rim by elastically straining the fairing.

18. A cycle wheel according to claim 1, wherein:
the fairing has an outer surface made at least almost entirely from the material having a density less than 120 kg/m$^3$.

19. A cycle wheel:
the fairing comprises circumferentially spaced-apart internal recesses alternating with circumferentially spaced apart regions of the material having a density less than 120 kg/m$^3$.

20. A cycle wheel comprising:
a rim;
the rim having a structure designed to receive a tire;
a fairing affixed to the rim opposite the structure of the rim designed to receive the tire;
the fairing being at least partially made from a material having a density less than 120 kg/m$^3$; and
the material of the fairing that has a density less than 120 kg/m$^3$ extending continuously around an entire circumference of the fairing.

21. A cycle wheel according to claim 20, wherein:
the material of the fairing extends transversely through an entire width of the fairing between opposite outer side surfaces of the fairing.

22. A cycle wheel according to claim 20, wherein:
the fairing includes opposite side surfaces of the material of the fairing;
the material of the fairing extends transversely through an entire width of the material of the fairing between the opposite side surfaces of the material.

* * * * *